Figure 1:
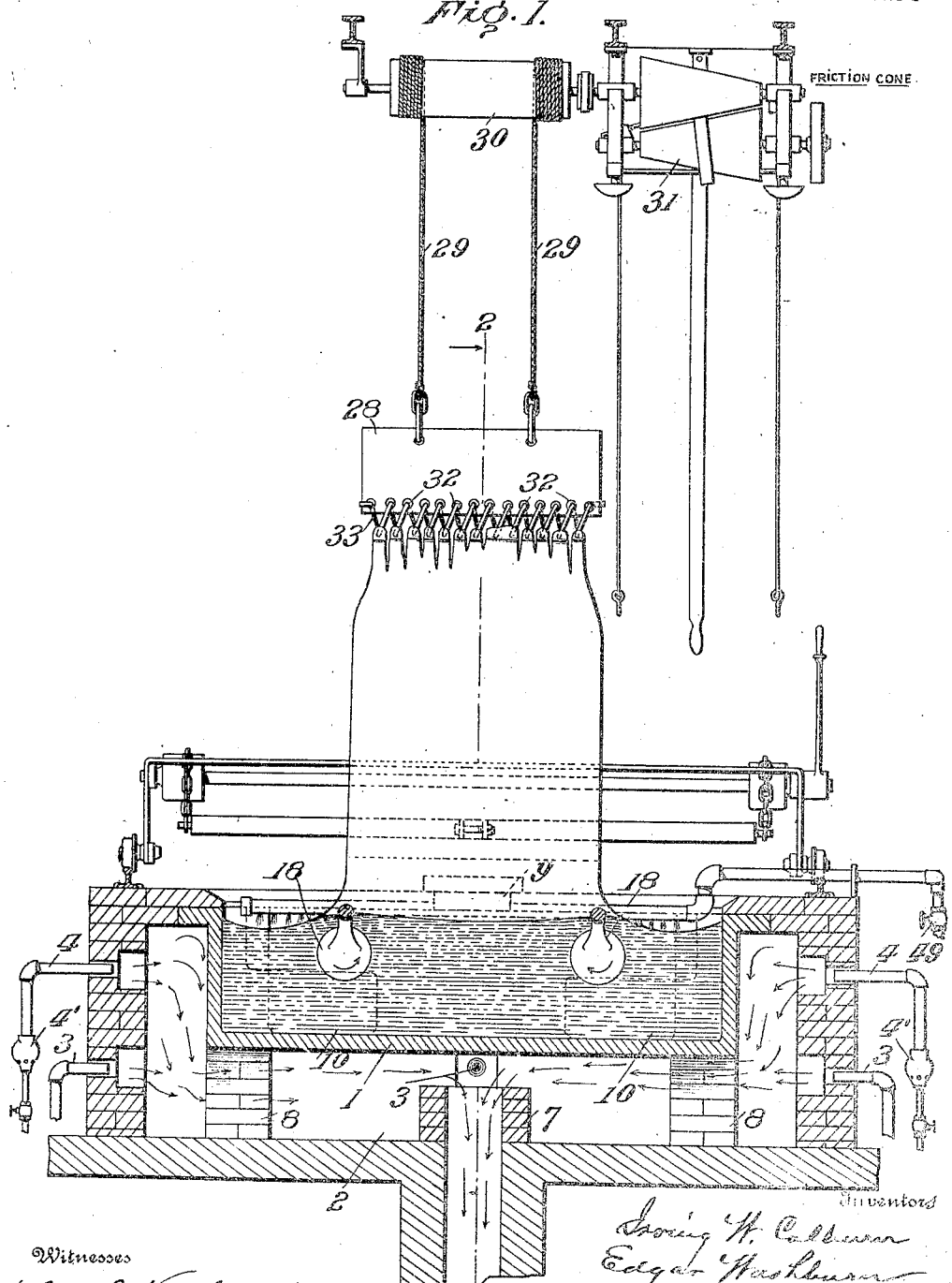

No. 821,786. PATENTED MAY 29, 1906.
I. W. COLBURN & E. WASHBURN.
PROCESS AND APPARATUS FOR DRAWING SHEET GLASS.
APPLICATION FILED MAR. 3, 1905.

4 SHEETS—SHEET 3.

No. 821,786. PATENTED MAY 29, 1906.
I. W. COLBURN & E. WASHBURN.
PROCESS AND APPARATUS FOR DRAWING SHEET GLASS.
APPLICATION FILED MAR. 3, 1905.
4 SHEETS—SHEET 4.
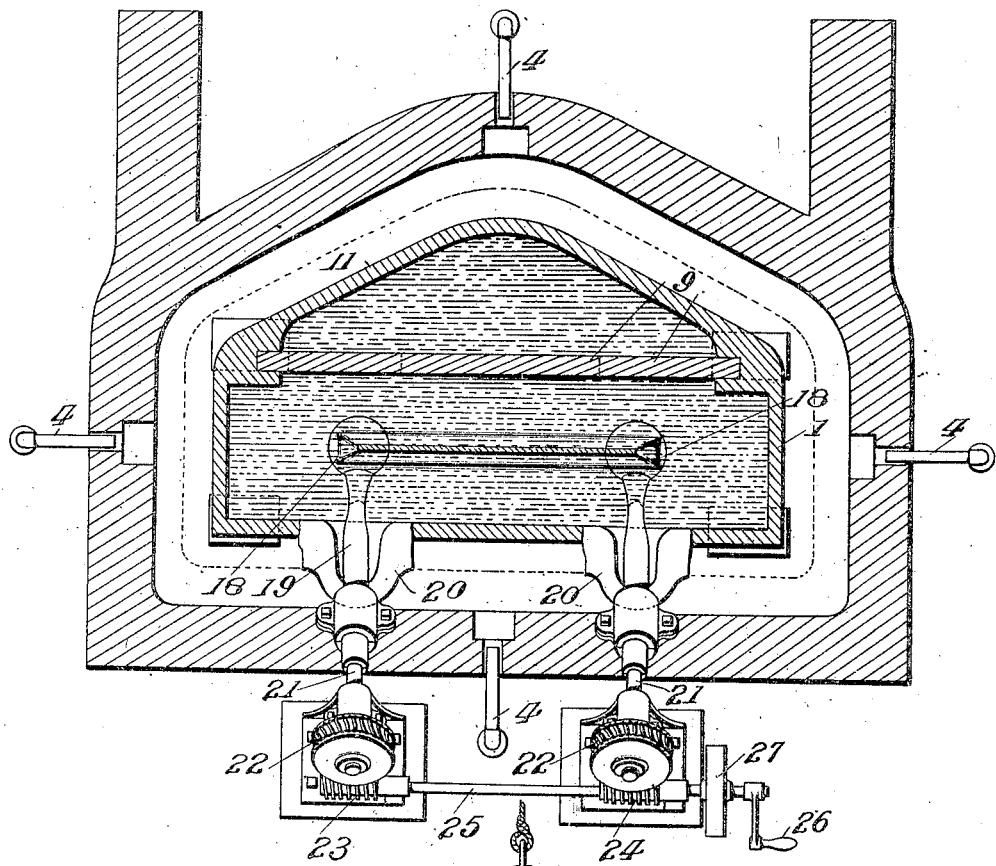
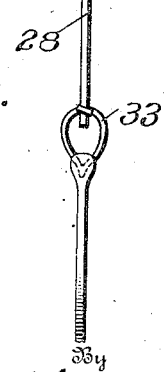

UNITED STATES PATENT OFFICE.

IRVING W. COLBURN AND EDGAR WASHBURN, OF FRANKLIN, PENNSYLVANIA; SAID WASHBURN ASSIGNOR TO SAID COLBURN.

PROCESS AND APPARATUS FOR DRAWING SHEET-GLASS.

No. 821,786.   Specification of Letters Patent.   Patented May 29, 1906.

Application filed March 3, 1905. Serial No. 248,288.

*To all whom it may concern:*

Be it known that we, IRVING W. COLBURN and EDGAR WASHBURN, of Franklin, Pennsylvania, have invented a new and useful Process and Apparatus for Drawing Sheet-Glass, which invention is fully set forth in the following specification.

This invention relates to the art of glass-working, and more particularly to the drawing of glass in sheet form from a mass of molten glass.

When it is attempted to draw a sheet of glass from a molten mass by inserting a bait therein and slowly moving the bait away from the molten mass, the glass at first is drawn in the form of a sheet nearly the width of the bait, which sheet almost immediately begins to draw narrower and as the operation continues rapidly narrows down, drawing thin to a thread if the operation be continued for any considerable length of time. This tendency of the glass to rapidly narrow when attempts are made to draw sheets of glass has made the drawing of sheet-glass from a mass of molten glass commercially impracticable.

The object of the present invention is to provide a process and an apparatus whereby a sheet of glass may be drawn from a mass of molten glass without narrowing or pulling to a thread during the drawing operation.

With this object in view the present invention consists particularly in the process of drawing sheet-glass by preparing a mass of molten glass, drawing a sheet of glass therefrom, and simultaneously imparting an outward movement to the surface of said mass at points adjacent to the edges of the sheet which is being drawn. By "outward movement" is meant a movement of that portion of the surface of the glass which is adjacent to the line where the sheet of glass leaves the molten glass, the movement of the glass being away from the central portion of the sheet outward—*i. e.*, toward the edge portions of the sheet. This outward movement of the surface portion of the molten glass results in a sheet being drawn which will remain approximately constant in width or will even slightly increase in width up to a given dimension as the drawing operation proceeds. This outward movement of the surface of the molten glass may be imparted to it in any suitable way. One very effective means for imparting this outward movement to the surface of the molten mass consists in immersing two bodies just below the surface of the molten glass and simultaneously revolving them in opposite directions, one with the hands of a clock and the other in a reverse direction. Preferably the bodies which are revolved beneath the surface of the molten mass are so near the surface that their revolution may cause the glass to slightly rise up or form an undulating surface somewhat above the general level of the molten glass in the receptacle containing the same. Any suitable form may be given to the bodies thus revolved beneath the surface of the molten mass. For the purpose of illustrating the invention these are herein shown as simple spheres, each operated with a shaft inclining upward and outward from the receptacle, the power being applied to the respective shafts in any suitable manner, as by right and left hand worm-gearing.

It has been found when drawing a sheet of any extent from a mass of molten glass that under some conditions the surface of the molten mass has a tendency to cool or become lowered in temperature to such an extent as to considerably impair the working condition of the glass around the outer confines or edges of the receptacle containing the same. With a view to overcoming this difficulty the invention further consists in drawing glass in sheet form from a mass of molten glass, while maintaining the surface of the molten mass, and particularly the edge portions thereof, in working condition by the application of heat to said surface. Various means may be employed for thus maintaining the temperature of the surface of the glass. As herein shown this is accomplished by directing a series of jets of flame downward against the surface of the molten mass adjacent to the outer edges or limits of the receptacle containing the same. These jets may in some cases be directed against the surface of the molten mass perpendicularly; but preferably each jet of flame has a downward and outward direction, impinging upon the surface of the glass at an acute angle. This is accomplished by placing within the mouth of the receptacle containing the molten glass a gas-conduit provided with a series of jet-openings directed outwardly and downwardly, such conduit being just above but immediately adjacent to the surface of the molten glass in the receptacle.

When glass is drawn in sheet form from a receptacle or working pot, it is desirable that the glass which enters the working pot to maintain the supply should enter at points adjacent to the edges of the sheet being drawn rather than adjacent to the central portion of the sheet. The molten mass may be supplied to the receptacle or working pot either by ladleing the glass thereinto or by conducting the molten glass thereto from a refining-chamber by means of suitable conduits. As herein shown, there is provided a working chamber or pot the working portion of which is separated by a suitable partition-wall from a receiving-chamber into which the glass is delivered, as through a delivery-opening, by a ladle. This partition between the working chamber and the receiving-chamber is provided with suitable openings or conduits adjacent to the opposite ends of the working chamber, through which the molten glass passes from the receiving-chamber to the working chamber or pot.

In drawing a sheet of glass by the use of a bait in the manner contemplated by the present invention it is of great importance that the sheet of glass as it cools should not crack away from the bait to which it is attached. This it is extremely liable to do with baits in the form of sheets of metal, such as have heretofore been commonly employed, since the coefficients of expansion of the glass and the metal composing the bait are widely different. For the purpose of avoiding this liability of the sheet of glass to crack from the bait during the drawing operation there is provided by the present invention a bait composed of a suitably-supported plate, to which is attached a coil of heavy wire, the general direction of the extension of the coil being along the lower edge of the plate—i. e., in the direction of the width of the sheet. This coil of wire is attached to the plate in any suitable manner, preferably by forming holes or openings through the lower edge of the plate and threading the coil through these openings. It has been found that when a bait of this character has been employed the sheet of glass will not crack therefrom during the drawing operation.

Another important consideration in drawing sheets of glass from a mass of molten glass lies in the fact that the mass should be the hottest at the bottom, the heated glass rising to the surface during the drawing operation. With the object of effectually accomplishing this desired end the present invention provides a working pot or receptacle for molten glass in combination with means for heating the same, the heat being applied most effectively at the bottom portion of the receptacle, and particularly at about the central part of the bottom portion. This manner of applying the heat is designed more particularly for the heating of the mass during the drawing operation. When it is simply desired to maintain the glass in the working pot or receptacle hot, as over night and between drawing operations, it is not essential that the fiercest heat should be thus at the bottom, and the present invention thus provides means also for heating the mass of molten glass around the sides of the chamber or pot to the end that the same may be maintained in working condition during the intervals between the drawing operations. Preferably the heat employed is that of gas-jets, and for the purpose of economy the heat employed to heat the sides of the working chamber or pot between the drawing operations is of the Bunsen-burner type.

In addition to the features indicated above the invention consists in minor details of construction and methods of operation which will be more specifically hereinafter described, and then pointed out in the claims.

It will be understood that the inventive idea involved in the above-mentioned process may receive various expressions without losing its identity, and a variety of forms of apparatus may be employed in practicing the process. Moreover, the inventive idea of means and devices constituting the mechanical part of the invention may receive various mechanical expressions, one of which is shown in the accompanying drawings for the purpose of illustrating the invention. Such drawings, however, are for the purpose of illustration only and not for the purpose of defining the limits or scope of the invention.

Figure 2:
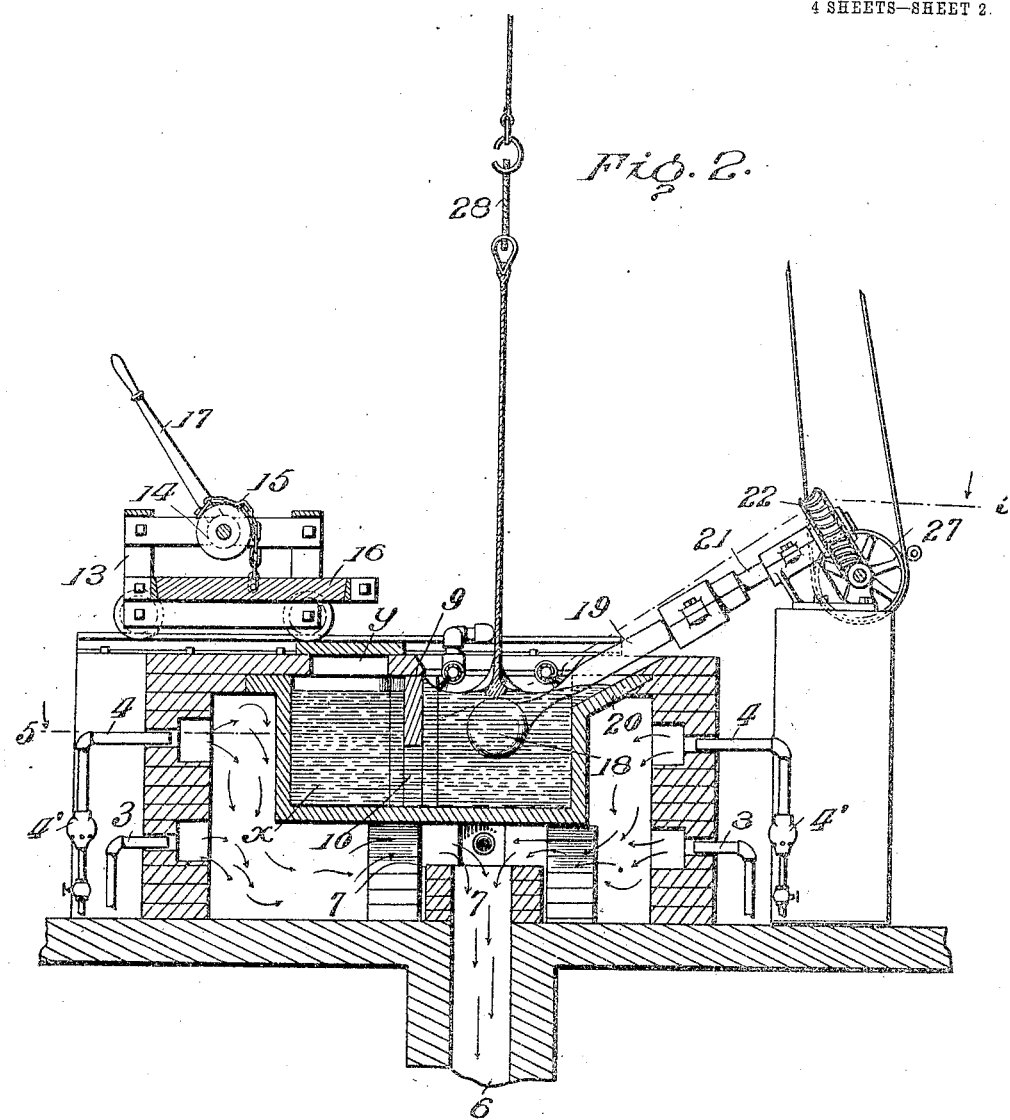
Figure 3:
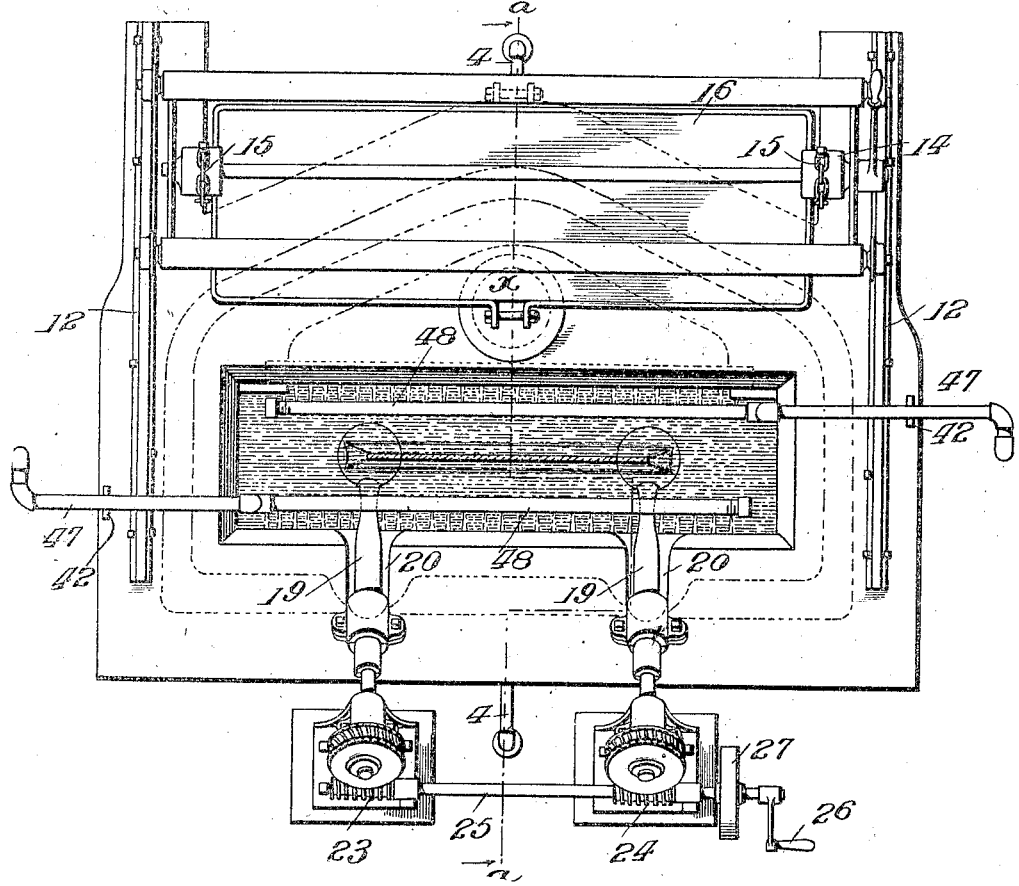
Figure 4:
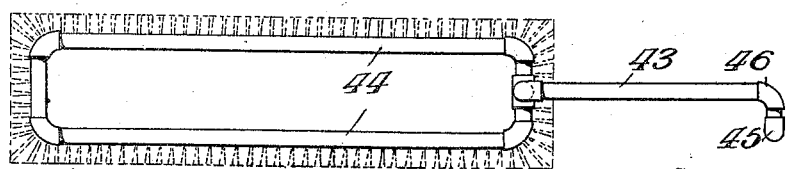

In said drawings, Figure 1 is a vertical transverse section through the working chamber or pot and the heating-furnace surrounding the furnace, the remaining portions of the apparatus being shown in front elevation. Fig. 2 is a vertical section taken at right angles to Fig. 1 on the line 2 2 of said figure. Fig. 3 is a top plan view of that portion of the apparatus shown in Fig. 1 below the bait, the sheet of glass being shown in horizontal section. Fig. 4 is a plan view of the jet-conduit for heating the surface of the molten glass adjacent to its edges during the drawing operation. Fig. 5 is a horizontal section taken on the line 5 5, Fig. 2. Fig. 6 is a side elevation of a bait with a sheet of glass attached thereto.

Referring to the drawings, 1 is a working chamber or pot surrounded by heating-chamber 2, supplied with heat from two sets of burners 3 and 4. Of these burners the series 3 3 enter the heating-chamber in a plane preferably just below the bottom of the working chamber or pot 1, and, as will appear from an inspection of Figs. 1 and 2, they are arranged in pairs, so that a jet of flame directed on one side will meet a jet of flame from another jet or burner 3 immediately opposite the same, the jets of flame from the various burners 3 converging or meeting substantially under the middle of the working chamber or pot. On the other hand, the burners 4 are in a plane considerably above the bottom of the working chamber and are of the Bunsen type, as indicated at 4', where provision is made for the introduction of air and the mixture of the same with the gas as it proceeds toward the opening of the burner into the heating-chamber. This heating-chamber is provided with offtake-flue 6, which is preferably arranged to conduct the products of combustion downward from a point immediately beneath the working chamber or pot and has its mouth or opening surrounded by a raised part 7, projecting considerably above the lower or bottom portion of the heating-chamber. It will be understood that the working chamber or pot is supported, as upon piers 8 8, within the heating-chamber.

The working chamber or pot is of novel construction, the main portion thereof being of oblong rectangular form, its rear side or face, however, bulging outward considerably to form a receiving-chamber x, having a filling-in opening y in its top. This bulging or segmental portion of the working pot is divided from the main or opening portion by a partition 9, through the lower portions of which are openings 10 10. (Shown in dotted lines in Fig. 1 and in full lines in Fig. 2.) The working chamber or pot 1 and the receiving-chamber 11 are, with the exception of this partition 9, preferably integral.

Provision is made for covering the working chamber or pot during the intervals between the drawing operations and for removing and transporting the cover to one side while the sheet of glass is being drawn. Referring to Figs. 2 and 3, 12 12 are rails or ways mounted upon the upper portion of the superstructure, upon which ways a carriage 13 is mounted to travel, which carriage is provided with drums 14 14, to which are secured a pair of chains or cables 15, the other ends of said chains or cables being attached to the cover 16, the drums 14 14 being operated by a lever 17, whereby the cover 16 may be raised or lowered, as the case may be. As shown in Fig. 2, the cover has been elevated and the carriage moved to one side in order to expose the glass in the working chamber or pot for the purpose of drawing the sheet therefrom.

For the purpose of imparting movement to the surface of the molten glass in the working chamber or pot away from the medial line of the sheet as it is being drawn means are provided for revolving a pair of bodies in the mass of molten glass just beneath the surface thereof and at points approximately under what is designed to be the edges of the sheet when drawn to its extreme width. These bodies thus revolved beneath the surface of the molten mass may be of any suitable form for accomplishing the outward movement of the mass as the bodies are slowly revolved in opposite directions. As herein shown, these bodies are in the form of spheres 18 18, of suitable refractory material, provided with shafts 19 19, preferably of the same material and integral with the spheres 18. These shafts 19 are inclined upwardly and outwardly, preferably at an angle of about thirty or thirty-five degrees from the horizontal, and to accommodate this upward and outward inclination of the shafts 19 the forward side of the working chamber or pot 1 is provided with two outwardly and upwardly flaring lips 20 20. (See Figs. 2 and 5.) The upward ends of the shafts 19 are polygonal in cross-section, these polygonal ends fitting in corresponding sockets secured to rotate with shafts 21 21, which shafts have on their outer ends worm-gears 22 22, gearing with right and left hand worms 23 and 24 on shaft 25, driven either by crank 26 or by power applied to pulley 27. (See Fig. 5.) The revolutions of the shaft 25 are such as to slowly revolve the spheres 18 18 in the direction indicated by the arrows in Fig. 1, and the spheres being near the surface of the mass of molten glass their revolution causes the surface portion of the molten mass to slightly rise or form an undulation immediately over the spheres and slowly move away from the medial line of the sheet of glass being drawn and in the direction of the edges of the sheet.

In practicing the process constituting a part of the invention herein any suitable bait and means for moving it outwardly from the mass of molten glass may be employed. Preferably, however, the bait shown in Figs. 1, 2, and 6 is employed. This bait consists of a plate 28 of any suitable material, as metal, suspended from a pair of cables 29 29, passing over a drum 30 and driven by any suitable power, as by an Evans friction-cone 31. (Shown in Fig. 1.) For the purpose of providing points of attachment for the sheet of glass to the plate 28 this plate has formed therein near its lower edge a series of holes or perforations 32, and through these holes or perforations a coil of wire 33 is threaded after the manner shown in Fig. 1. This coil, if desired, may be a regular cylindrical spiral; but preferably the outline of the coil in cross-section is such as shown in Figs. 2 and 6, wherein the lower edge or side of the coil has flattened, so that each spiral forms a rounded point. The sheet of glass at the beginning of the operation attaches itself to the lower or pointed portions of the spiral coil and does not come in contact with the plate 28. The result of this is that as the sheet contracts in cooling the spirals of the coil yield, so as to avoid placing any strain upon the sheet due to its contraction, and the cracking of the glass from the bait is thereby effectually prevented.

It has been found when drawing a sheet of glass from a mass of molten glass in the manner indicated herein that the surface of the molten glass, and particularly that portion of the surface adjacent to the walls of the receiving chamber or pot, becomes cooled through radiation due to exposure of the surface during the drawing operation, and this cooling materially affects the working condition of the molten mass. For the purpose of avoiding this cooling of the surface of the molten mass there is herein provided a means for supplying heat directly to the exposed surface, and particularly to that portion of the exposed surface lying upon the confines or outer edges of the mass of molten glass. Any suitable means for imparting heat to the surface of the molten mass around its edges or confines may be employed. As herein shown said means consists of a conduit or conduits bearing a series of gas-jets, which are located near the surface of the molten mass and around the edges thereof, the jets being so positioned as to direct the flame against the surface of the molten mass, preferably in a downward and outward direction, though, if desired, the jets might be directed against the surface in a practically vertical line. Referring to Fig. 4, 43 is a pipe leading from a source of fuel-supply, as gas, and 44 is a ring of pipe connected to 43, the shape of the ring 44 being practically that of the inside of the working chamber or pot 1, though somewhat smaller. This pipe 44 is provided with a series of small openings, through which the gas passes, these, in effect, constituting a burner provided with a series of jet-openings. As will be understood from an inspection of Fig. 4, these jet-openings are formed so as to direct the flame in an outward and downward direction against the surface of the molten mass in the working chamber or pot. The pipe 43 is connected to the main conduit 45 by a flexible joint 46, whereby the ring 44 may be raised up out of position when it is desired to place the cover 16 over the mass of molten glass in the working chamber. Instead of the ring 44 and a single pipe 43 there may be used a plurality of gas pipes or conduits 47 47, Fig. 3, each connected by flexible joints to a main gas-conduit and each provided with a burner 48 extending in a straight line along the sides of the working chamber or pot, adjacent to the surface thereof, and provided with small burner openings, which direct the flame in an outward and downward direction against the surface of the molten glass, as is clearly shown in Fig. 3.

Operation: The glass in the working chamber or pot having been brought to the proper heat and working condition and the burners 3 being ignited, while the burners 4 are turned off, the cover 16 is raised from off the working pot by revolving the drums 14 through the action of the lever 17, and the carriage 13 is run back upon the ways to the position indicated in Fig. 2. The bait having been lowered so as to permit the power or pointed portions of the wire-coil to become immersed in the mass of molten glass, the burners for heating the surface of the molten glass being in position, and the gas issuing therefrom being ignited, the bait is started upward by revolving the drum 30, and simultaneously with the upward movement of the bait the spheres 18 18 are slowly revolved in the direction indicated by the arrows in Fig. 1, thereby causing the glass on the surface of the molten mass to move slowly away from the medial line of the sheet as it is drawn and in the direction of the sheet's edges. This outward movement of the surface portion of the molten glass exerts a stretching action upon the sheet in the direction of its edges as the sheet is drawn upward by the bait. The sheet of glass having been drawn to the desired length, the direction of revolution of the spheres 18 is reversed, whereupon the sheet of glass will rapidly draw to a thread or rod, which can be severed by cracking off or by shears, thereby leaving the molten mass in suitable condition for repeating the operation, since the surface is not fouled by masses of broken glass falling thereinto. If desired, the cover 16 may then be replaced over the working chamber or pot, and if the drawing operation is not immediately repeated and it is only desired to keep the molten glass in the working chamber or pot in a melted condition the burners 3 3, which have been in use during the drawing operation, are cut off and the burners 4 4 are ignited, and by directing their jets directly against the sides of the working chamber or pot they serve to keep it in the desired condition during the interval.

What is claimed is—

1. The method of drawing sheet-glass which consists in preparing a mass of molten glass, drawing a sheet of glass therefrom, and simultaneously imparting movement to the surface portion of the molten mass away from the medial line of the sheet and in the direction of the edges of the sheet.

2. The method of drawing sheet-glass which consists in preparing a mass of molten glass, drawing a sheet of glass therefrom, and simultaneously imparting movement to the surface portion of the molten mass in opposite directions away from the medial line of the sheet and in the direction of the edges of the sheet.

3. The method of drawing sheet-glass which consists in preparing a mass of molten glass, drawing a sheet of glass therefrom, simultaneously imparting movement to the surface portion of the molten mass in opposite directions away from the medial line and toward the edges of the sheet, and imparting heat to the surface of the molten mass on opposite sides of the sheet.

4. The method of drawing sheet-glass which consists in preparing a mass of molten glass, drawing a sheet of glass therefrom while the surface portion of the mass adjacent to said sheet is kept moving away from the medial line of the sheet toward its edges, and supplying heat to the surface of said molten mass.

5. The method of drawing sheet-glass which consists in preparing a mass of molten glass, and drawing a sheet of glass therefrom while the surface portion of said mass is kept moving away from the medial line of the sheet toward the edges.

6. In glass-drawing apparatus, the combination of a receptacle containing molten glass, means for drawing a sheet of glass therefrom, and means moving the surface portion of the molten glass away from the medial line of the sheet toward its edges.

7. In glass-drawing apparatus, the combination of a receptacle containing molten glass, means for drawing a sheet of glass therefrom, and means imparting movement to the surface portion of said molten glass in opposite directions from the middle thereof.

8. In glass-drawing apparatus, the combination of a receptacle containing a mass of molten glass, means for drawing a sheet of glass therefrom, and means within said mass for stretching said sheet as drawn.

9. In glass-drawing apparatus, the combination of a receptacle containing a mass of molten glass, means for drawing a sheet of glass therefrom, and a plurality of revolving bodies beneath the surface of said mass.

10. In glass-drawing apparatus, the combination of a receptacle containing a mass of molten glass, means for drawing a sheet of glass therefrom, and a plurality of bodies revolving in opposite directions beneath the surface of said mass.

11. In glass-drawing apparatus, the combination of a receptacle containing a mass of molten glass, two revolving bodies beneath the surface of the mass, and means for drawing a sheet of glass from the said mass between said bodies.

12. In glass-drawing apparatus, the combination of a receptacle containing a mass of molten glass, two spherical bodies revoluble in opposite directions beneath the surface of said mass, means for revolving said bodies, and means for drawing a sheet of glass from the mass between said bodies.

13. In an apparatus for drawing sheet-glass, the combination of a receptacle containing a mass of molten glass, means for drawing a sheet of glass therefrom, means for imparting heat to the bottom of said mass of molten glass, and means located below the surface of the mass and acting to impart motion to said surface away from the medial line of the sheet and toward its edges during the drawing operation.

14. In apparatus for drawing sheet-glass, the combination of a receptacle containing a mass of molten glass, means for drawing a sheet of glass therefrom, means for heating said mass of molten glass at its bottom, means for heating the upper surface of said mass during the drawing operation, and means located below the surface of said molten mass and imparting an outward movement to the surface of the mass from the medial line of the sheet toward its edges.

15. In an apparatus for drawing sheet-glass, the combination of a receptacle containing a mass of molten glass, means for drawing a sheet of glass therefrom, two bodies located beneath the surface of said mass adjacent to the edges of the sheet as drawn, and means for revolving said bodies in opposite directions.

16. In an apparatus for drawing sheet-glass, the combination of a receptacle containing a mass of molten glass, means for drawing a sheet of glass therefrom, two spheres located beneath the surface of said mass and adjacent to the edges of the sheet being drawn, and means revolving said spheres in opposite directions during the drawing operation.

17. In apparatus for drawing sheet-glass, the combination of a receptacle containing a mass of molten glass, a plurality of burners the flames from which converge to a common point under said receptacle, means for drawing a sheet of glass from said mass, and a burner directing jets of flame in a downward and outward direction upon the surface of said mass on opposite sides of the sheet as drawn.

18. In apparatus for drawing sheet-glass, a receptacle containing a mass of molten glass, means for drawing a sheet of glass therefrom, and a burner surrounding said sheet and directing jets of flame in a downward and outward direction upon the surface of said mass during the drawing operation.

19. In an apparatus for drawing sheet-glass, the combination of a receptacle containing a mass of molten glass, means for drawing a sheet of glass therefrom one of the walls of said receptacle having a pair of upwardly and outwardly inclined lips, a pair of upwardly and outwardly inclined shafts revolving in said lips and a pair of revoluble bodies operatively connected to said shafts below the surface of said molten mass.

20. In an apparatus for drawing sheet-glass, the combination of a receptacle containing a mass of molten glass, and a bait for drawing a sheet of glass therefrom, said bait consisting of a plate having a horizontally-disposed metallic coil secured thereto.

21. In apparatus for drawing sheet-glass, a receptacle containing a mass of molten glass, a bait for drawing a sheet of glass therefrom, said bait consisting of a metallic plate having a horizontally-disposed coil of wire secured thereto, and means for operating said bait.

22. In apparatus for drawing sheet-glass, a receptacle containing a mass of molten glass, a bait for drawing a sheet of glass therefrom, said bait consisting of a plate having a series of holes along its lower edge, and a coil of wire threaded through said holes, and means for operating said bait.

23. In an apparatus for drawing sheet-glass, the combination of a receptacle containing a mass of molten glass, a pair of inclined shafts operatively connected to two revoluble bodies beneath the surface of said mass and having worm-gears on their outer ends, a right and left hand worm engaging said gears, and means for operating said worm.

24. In glass-drawing apparatus, the combination of a receptacle containing a mass of molten glass, means for drawing a sheet therefrom, and means moving within said mass for counteracting the narrowing tendency of the sheet.

In testimony whereof we have signed this specification in the presence of two subscribing witnesses.

IRVING W. COLBURN.
EDGAR WASHBURN.

Witnesses:
FRANCES L. KING,
J. H. OSMER.